(12) United States Patent
Wu

(10) Patent No.: US 11,776,322 B2
(45) Date of Patent: Oct. 3, 2023

(54) PINCH GESTURE DETECTION AND RECOGNITION METHOD, DEVICE AND SYSTEM

(71) Applicant: QINGDAO PICO TECHNOLOGY CO., LTD., Shandong (CN)

(72) Inventor: Tao Wu, Shandong (CN)

(73) Assignee: QINGDAO PICO TECHNOLOGY CO., LTD., Shandong Province (CN)

(*) Notice: Subject to any disclaimer, the term of this patent is extended or adjusted under 35 U.S.C. 154(b) by 0 days.

(21) Appl. No.: 17/880,769

(22) Filed: Aug. 4, 2022

(65) Prior Publication Data

US 2022/0375269 A1     Nov. 24, 2022

Related U.S. Application Data

(63) Continuation of application No. PCT/CN2021/123348, filed on Oct. 12, 2021.

(30) Foreign Application Priority Data

Feb. 7, 2021   (CN) .......................... 202110182469.1

(51) Int. Cl.
*G06T 7/00*        (2017.01)
*G06V 40/20*       (2022.01)
(Continued)

(52) U.S. Cl.
CPC .............. *G06V 40/28* (2022.01); *G06F 3/017* (2013.01); *G06T 7/73* (2017.01); *G06V 10/25* (2022.01);
(Continued)

(58) Field of Classification Search
CPC ........ G06V 40/28; G06V 10/25; G06V 10/28; G06V 10/44; G06V 10/774; G06V 10/82;
(Continued)

(56) References Cited

U.S. PATENT DOCUMENTS

| | | | |
|---|---|---|---|
| 10,261,595 B1* | 4/2019 | Kin | G06F 3/04815 |
| 2015/0153833 A1 | 6/2015 | Pinault et al. | |
| 2018/0307319 A1 | 10/2018 | Karmon et al. | |
| 2020/0225758 A1* | 7/2020 | Tang | G06F 3/011 |
| 2020/0272099 A1* | 8/2020 | Linville | G03H 1/0005 |
| 2021/0200323 A1* | 7/2021 | Dogan | G06F 30/12 |

FOREIGN PATENT DOCUMENTS

| | | |
|---|---|---|
| CN | 103971102 A | 8/2014 |
| CN | 105378593 A | 3/2016 |

(Continued)

OTHER PUBLICATIONS

International Search Report dated Jan. 17, 2022 in International Patent Application No. PCT/CN2021/123348.

(Continued)

*Primary Examiner* — Ping Y Hsieh

(57) ABSTRACT

The present application relates to the technical field of image recognition and provides a pinch gesture detection and recognition method, which is applied to an electronic device and includes: acquiring, in real time, image data of each frame in a video to be detected; performing a hand location detection on the image data based on a pre-trained hand detection model, to determine a hand position of the image data; performing a skeleton point recognition at the hand position based on the pre-trained skeleton point recognition model, to determine a preset number of skeleton points at the hand position; and determining whether a hand corresponding to the image data is in a pinch gesture or not according to information of a distance between the skeleton points of preset fingers.

20 Claims, 3 Drawing Sheets

(51) Int. Cl.
*G06T 7/73* (2017.01)
*G06V 10/25* (2022.01)
*G06V 10/82* (2022.01)
*G06V 10/44* (2022.01)
*G06V 10/28* (2022.01)
*G06V 10/774* (2022.01)
*G06F 3/01* (2006.01)

(52) U.S. Cl.
CPC .............. *G06V 10/28* (2022.01); *G06V 10/44* (2022.01); *G06V 10/774* (2022.01); *G06V 10/82* (2022.01); *G06T 2207/20081* (2013.01); *G06T 2207/20084* (2013.01); *G06T 2207/30196* (2013.01)

(58) Field of Classification Search
CPC ...... G06V 20/20; G06V 20/64; G06V 40/107; G06V 40/117; G06F 3/017; G06T 7/73; G06T 2207/20081; G06T 2207/20084; G06T 2207/30196; G06N 3/08
See application file for complete search history.

(56) References Cited

FOREIGN PATENT DOCUMENTS

| | | | |
|---|---|---|---|
| CN | 107292295 | A | 10/2017 |
| CN | 109634415 | A | 4/2019 |
| CN | 110796033 | A | 2/2020 |
| CN | 111368770 | A | 7/2020 |
| CN | 111722700 | A | 9/2020 |
| CN | 112083800 | A | 12/2020 |
| CN | 112083801 | A | 12/2020 |
| CN | 112183424 | A | 1/2021 |
| CN | 112926423 | A | 6/2021 |
| WO | 2020244071 | A1 | 12/2020 |

OTHER PUBLICATIONS

Gu De, Li Ji. Hand and finger tracking based on Kinect depth information. Computer Engineering and Applications, 2015, SI (7): 165-168, English abstract.

* cited by examiner

PINCH GESTURE DETECTION AND RECOGNITION METHOD, DEVICE AND SYSTEM

CROSS-REFERENCE TO RELATED APPLICATIONS

This application is a continuation of PCT International Application No. PCT/CN2021/123348 filed on Oct. 12, 2021, which claims priority to Chinese Patent Application No. 202110182469.1, filed to the China National Intellectual Property Administration on Feb. 7, 2021 and entitled "a Pinch Gesture Detection and Recognition Method, Device and System", the content of which is hereby incorporated by reference in its entirety.

TECHNICAL FIELD

The present application relates to the technical field of image detection, in particular to a pinch gesture detection and recognition method, a device and a system.

BACKGROUND

At present, more and more Virtual Reality (VR)/Augmented Reality (AR)/Mixed Reality (MR) integrated machines are increasingly entering people's lives, its main application scenario is that when the user interacts with VR/AR/MR scene, the multi-target tracking camera on the head automatically recognizes and tracks some behavior trajectory information of the user's hand, and detects gesture instructions through some behavior trajectories of the hand, and then interacts with the virtual scene as input information of an artificial virtual reality system.

For a spatial location of the above integrated equipment, it is common and popular to provide one or more monochrome fisheye tracking cameras in the integrated equipment, to locate the position and orientation information of the integrated equipment relative to the physical space environment in real time through the tracking cameras. In addition, in order to enhance the immersion of VR/AR/MR integrated equipment and make this kind of equipment have better human-computer interaction experience, gesture interaction module, as a key module, is essential, and it occupies an increasingly important position in VR/AR/MR scene interaction.

When the existing gesture interaction module collects user's hand motion information, it usually collects an Electromyography (EMG) signal of the hand motion in the arm, and then judges the hand motion according to the EMG signal. This method has high cost and needs a corresponding arm acquisition device, and the user has poor wearing experience effect; moreover, the recognition accuracy of fingers is poor by using a simple gesture recognition model and directly recognizing gestures through the recognition model, which is prone to misjudgment, and the applicable scenarios are limited, which affects the user experience.

SUMMARY

In view of the above problems, a purpose of the present application is to provide a pinch gesture detection and recognition method, a device and a system, so as to solve the problems of high cost, poor wearing effect, low recognition accuracy, influence on user experience and the like existing in the prior gesture detection method.

A pinch gesture detection and recognition method provided by the present application, applied to an electronic device, includes: acquiring, in real time, image data of each frame in a video to be detected; performing a hand location detection on the image data based on a pre-trained hand detection model, to determine a hand position of the image data; performing a skeleton point recognition at the hand position based on the pre-trained skeleton point recognition model, to determine a preset number of skeleton points at the hand position; and determining whether a hand corresponding to the image data is in a pinch gesture or not according to information of a distance between the skeleton points of preset fingers.

Further, in at least one exemplary embodiment, the image data of each frame is acquired by at least two fisheye tracking cameras, and determining the preset number of skeleton points at the hand position includes: determining two-dimensional coordinate information of the preset number of skeleton points at the hand position based on the skeleton point recognition model; and acquiring three-dimensional position coordinate information corresponding to the two-dimensional coordinate information in real time according to the two-dimensional coordinate information and a stereoscopic triangulation imaging principle; wherein the three-dimensional position coordinate information is used for determining the information of the distance between the skeleton points of the preset fingers.

Further, in at least one exemplary embodiment, the operation of determining whether the hand is in the pinch gesture according to information of the distance between the skeleton points of preset fingers includes determining a three-dimensional Euclidean distance between the skeleton points corresponding to the preset fingers according to the three-dimensional coordinate position information; and determining the hand is in the pinch gesture in a case where the three-dimensional Euclidean distance is smaller than a preset threshold; determining the hand is not in the pinch gesture in a case where the three-dimensional Euclidean distance is greater than or equal to the preset threshold.

Further, in at least one exemplary embodiment, the method further includes: acquiring an Region of Interest (ROI) of the hand position on the corresponding image data through a hand detection model, and acquiring an ROI image corresponding to the ROI; performing a binary processing on the ROI image to acquire a corresponding binary image; acquiring information of a contour between the preset fingers in the binary image based on the skeleton points and an image processing principle; acquiring a contour feature distance corresponding to the information of the contour and an Euclidean distance between fingertip skeleton points of the preset fingers; and determining the hand is in the pinch gesture in a case where the contour feature distance is greater than the Euclidean distance and the three-dimensional Euclidean distance between preset two fingers at the hand position is smaller than the preset threshold.

In addition, in at least one exemplary embodiment, a training process of the hand detection model includes: labeling a target area in an acquired training image data, and acquiring labeled position information, wherein the target area is a hand area; and performing, using a yolo model, a parameter training on the labeled position information until the yolo model converges within a corresponding preset range, to complete training of the hand detection model.

In addition, in at least one exemplary embodiment, a training process of the skeleton point recognition model includes: training a basic neural network model based on a training image data until the basic neural network model converges within a corresponding preset range, to complete the training of the skeleton point recognition model; wherein the basic neural network model includes a yolo model, a Convolutional Neural Network (CNN) model, an Single Shot MultiBox Detector (SSD) model or an Feature Pyramid Network (FPN) model.

Further, in at least one exemplary embodiment, the method further includes: acquiring pinch gesture information of the image data of a preset number of continuous frames; and determining the hand in the video to be detected is in the pinch gesture in a case where the hands of the image data of the preset number of frames are all in pinch gestures.

Further, in at least one exemplary embodiment, the preset number of skeleton points include 21 skeleton points; and the 21 skeleton points include 3 skeleton points and 1 fingertip skeleton point for each finger, and 1 palm point of the hand.

Further, in at least one exemplary embodiment, the acquired training image data is acquired by a plurality of fisheye tracking cameras on head-mounted integrated equipment.

Further, in at least one exemplary embodiment, the training image data is acquired by a plurality of fisheye tracking cameras on a head-mounted integrated equipment.

In addition, the present application also provides an electronic device, which includes: a memory, a processor and a camera device, wherein the memory includes a pinch gesture detection and recognition program, when the pinch gesture detection and recognition program is executed by the processor, the following operations are implemented: acquiring, in real time, image data of each frame in a video to be detected; performing a hand location detection on the image data based on a pre-trained hand detection model, to determine a hand position of the image data; performing a skeleton point recognition at the hand position based on the pre-trained skeleton point recognition model, to determine a preset number of skeleton points at the hand position; and determining whether the hand is in a pinch gesture or not according to information of a distance between the skeleton points of preset fingers.

The present application also provides a pinch gesture detection and recognition system, which includes: an image data acquisition unit configured to acquire, in real time, image data of each frame in a video to be detected; a hand position determination unit configured to perform a hand location detection on the image data based on a pre-trained hand detection model, to determine a hand position of the image data; a skeleton point determination unit configured to perform a skeleton point recognition at the hand position based on the pre-trained skeleton point recognition model, to determine a preset number of skeleton points at the hand position; and a gesture determination unit configured to determine whether a hand corresponding to the image data is in a pinch gesture or not according to information of a distance between the skeleton points of preset fingers.

The present application also provides a computer-readable storage medium having a computer program stored thereon, which, when executed by a processor, implements the pinch gesture detection and recognition method of any one of the above method embodiments.

With the above pinch gesture detection and recognition method, device and system, by performing a hand location detection on the image data by a pre-trained hand detection model, to determine a hand position of the image data; then performing a skeleton point recognition on the determined hand position based on the pre-trained skeleton point recognition model, and determining a preset number of skeleton points at the hand position; and at last determining whether a hand corresponding to the image data is in a pinch gesture or not according to information of a distance between the skeleton points of preset fingers, the human body posture at small parts such as fingers can be recognized with high detection accuracy, speed and flexibility.

To achieve the above and related objects, one or more aspects of the present application include features that will be described in detail later. The following description and accompanying drawings detail certain exemplary aspects of the present application. However, these aspects are indicative of only some of the various ways in which the principles of the present application may be used. In addition, the present application is intended to include all these aspects and their equivalents.

BRIEF DESCRIPTION OF THE DRAWINGS

Other objects and results of the present application will be more apparent and readily understood by reference to the following description taken in conjunction with the accompanying drawings and with a fuller understanding of the present application. In the drawings.

The same label may be used in all drawings to indicate similar or corresponding features or functions.

DETAILED DESCRIPTION OF THE EMBODIMENTS

In the following description, for purposes of explanation, numerous specific details are set forth in order to provide a thorough understanding of one or more embodiments. It may be evident, however, that such embodiment(s) may be practiced without these specific details. In other examples, known structures and devices are shown in block diagram form in order to facilitate the description of one or more embodiments.

In order to describe the pinch gesture detection and recognition method, device and system of the present application in details, specific embodiments of the present application will be described in detail below with reference to the accompanying drawings.

Figure 1:
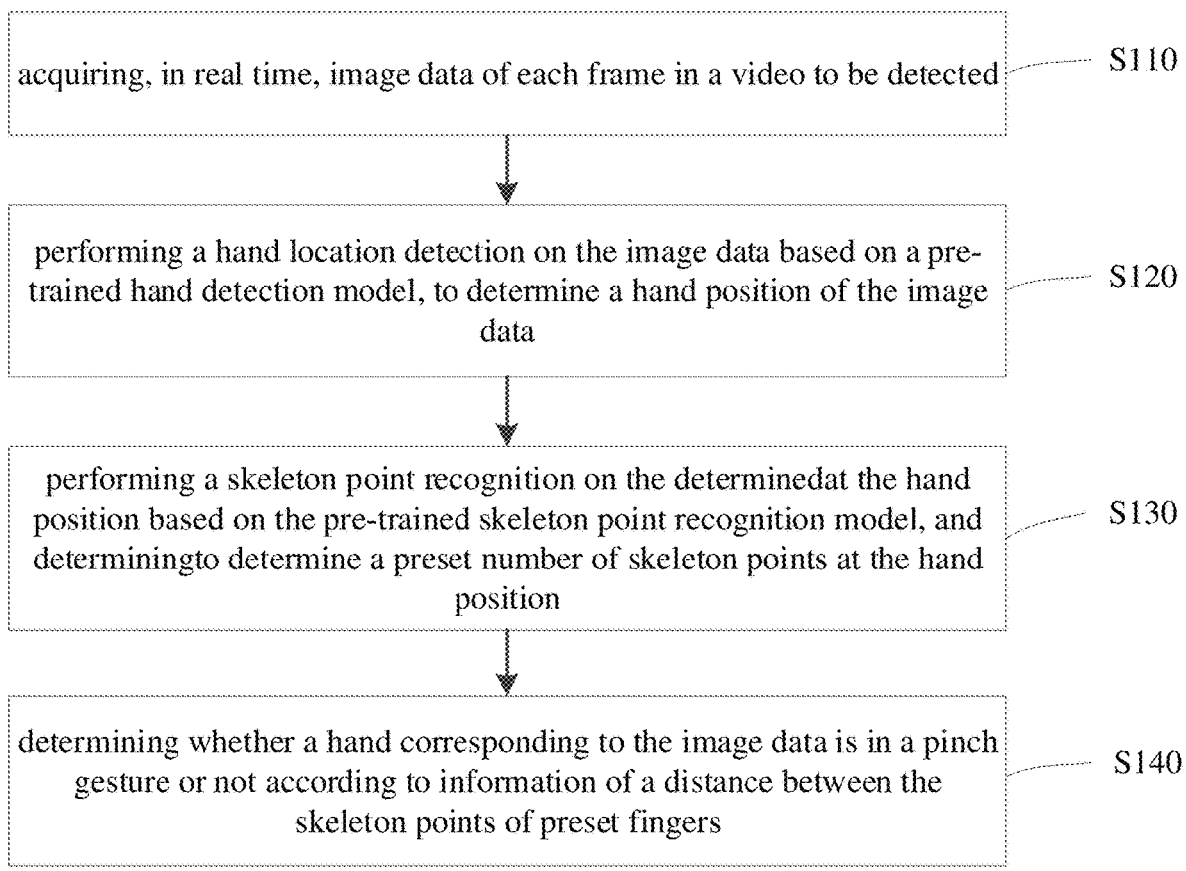
FIG. 1 is a flowchart of a pinch gesture detection and recognition method according to an embodiment of the present application.

FIG. 1 shows a flow of a pinch gesture detection and recognition method according to an embodiment of the present application.

As shown in FIG. 1, the pinch gesture detection and recognition method of the embodiment of the present application includes the following operations:

S110: acquiring, in real time, image data of each frame in a video to be detected.

When the pinch gesture detection and recognition method of the present application is applied to VR/AR/MR head-mounted integrated equipment, as VR/AR/MR head-mounted integrated equipment basically adopts Inside-Out positioning and tracking scheme, that is, at least two tracking fisheye cameras (or fisheye tracking cameras) built in the head-mounted end can locate the position and orientation information of the head-mounted integrated machine relative to the physical environment in real time, so the image data can be the image data of each frame in the video to be detected shot by the tracking fisheye camera.

It can be seen that the image data may also be image data in which a posture detection of small parts such as gestures is required in other videos and is not specifically limited in the present application.

S120: performing a hand location detection on the image data based on a pre-trained hand detection model, to determine a hand position of the image data.

Specifically, the pre-training process of the hand detection model includes:

S121: acquiring training image data;

S122: labeling a target area in the acquired training image data, and acquiring labeled position information, wherein the target area is a hand area; and S123: performing, using a yolo model, a parameter training on the labeled position information until the yolo model converges within a corresponding preset range, to complete training of the hand detection model.

It can be seen that the hand detection model can also be trained by other neural network models, and does not limited to the specific training process mentioned above.

S130: performing a skeleton point recognition at the hand position based on the pre-trained skeleton point recognition model, to determine a preset number of skeleton points at the hand position.

The pre-training process of the skeleton point recognition model includes:

S131: acquiring training image data;

S132: training the basic neural network model based on the acquired training image data until the basic neural network model converges within a corresponding preset range to complete the pre-training of skeleton point recognition model; wherein the basic neural network model includes a yolo model, a CNN model, an SSD model or an FPN model.

It should be noted that in the above operations S120 and S130, the training image data can be acquired through a plurality of tracking fisheye cameras on the head-mounted integrated equipment. For example, the hand movements of 150 users can be acquired via the tracking fisheye cameras, to acquire 2 million image data; and when the video to be detected is other types of video, the corresponding training image data can also be other image information that needs to be collected for small movements.

Specifically, the image data of each frame is acquired by at least two fisheye tracking cameras, and the operation of determining the preset number of skeleton points at the hand position includes:

1. determining two-dimensional coordinate information of the preset number of skeleton points at the hand position based on the skeleton point recognition model. The image data of each frame collected by two tracking fisheye cameras are acquired, and two-dimensional coordinates of a preset number of skeleton points at the hand position are determined by the skeleton point recognition model acquired by pre-training.

It should be noted that, the preset number of skeleton points may include 21 skeleton points, further, the 21 skeleton points include 3 skeleton points and 1 fingertip skeleton point for each finger, and 1 palm point of the hand, i.e., the 21 skeleton points of the hand are respectively distributed at 4 skeleton points of each finger (the skeleton points at three joints and one finger tip of each finger) and 1 skeleton point at the palm.

In addition, the specific number and position of the preset number of skeleton points can be set or adjusted according to specific application scenarios or requirements.

Moreover, in the pinch gesture detection and recognition method of the present application, it is realized by multiplexing a plurality of tracking fisheye cameras of VR/AR/MR head-mounted integrated equipment, and the parameters of tracking fisheye camera described herein are as follows: FOV: 143°*107°*163° (H*V*D); Resolution: 640*480; Frame rate: 30 Hz; Exposure mode: Global shutter; Color channel: monochrome.

2. Acquiring three-dimensional position coordinate information corresponding to the two-dimensional coordinate information in real time according to the two-dimensional coordinate information and a stereoscopic triangulation imaging principle; wherein the three-dimensional position coordinate information is used for determining the information of the distance between the skeleton points of the preset fingers.

S140: determining whether a hand corresponding to the image data is in a pinch gesture or not according to information of a distance between the skeleton points of preset fingers.

The operation of determining whether the hand is in the pinch gesture or not according to information of the distance between the skeleton points of preset fingers includes:

1. determining a three-dimensional Euclidean distance between the skeleton points corresponding to the preset fingers according to the three-dimensional coordinate position information; 2. determining the hand is in the pinch gesture in a case where the three-dimensional Euclidean distance is smaller than a preset threshold; or determining the hand is not in the pinch gesture in a case where the three-dimensional Euclidean distance is greater than or equal to the preset threshold.

The preset finger can be set according to the behavior habits or requirements of users, for gestures that conform to the usage habits of most people, the preset fingers can be set as thumb and index finger, and whether they form pinch gestures can be determined by the unit Euclidean distance in their brackets. When they meet the requirements of pinch gestures, they can simulate the determination events of the mouse and input the determination information instructions in VR/AR/MR scenes.

In order to ensure the accuracy of gesture recognition and reduce the misjudgment rate of gestures, in a specific embodiment of the present application, a distance judgment item can also be added, and when the gesture meets two judgment conditions, it is finally determined as a pinch gesture.

Figure 2:
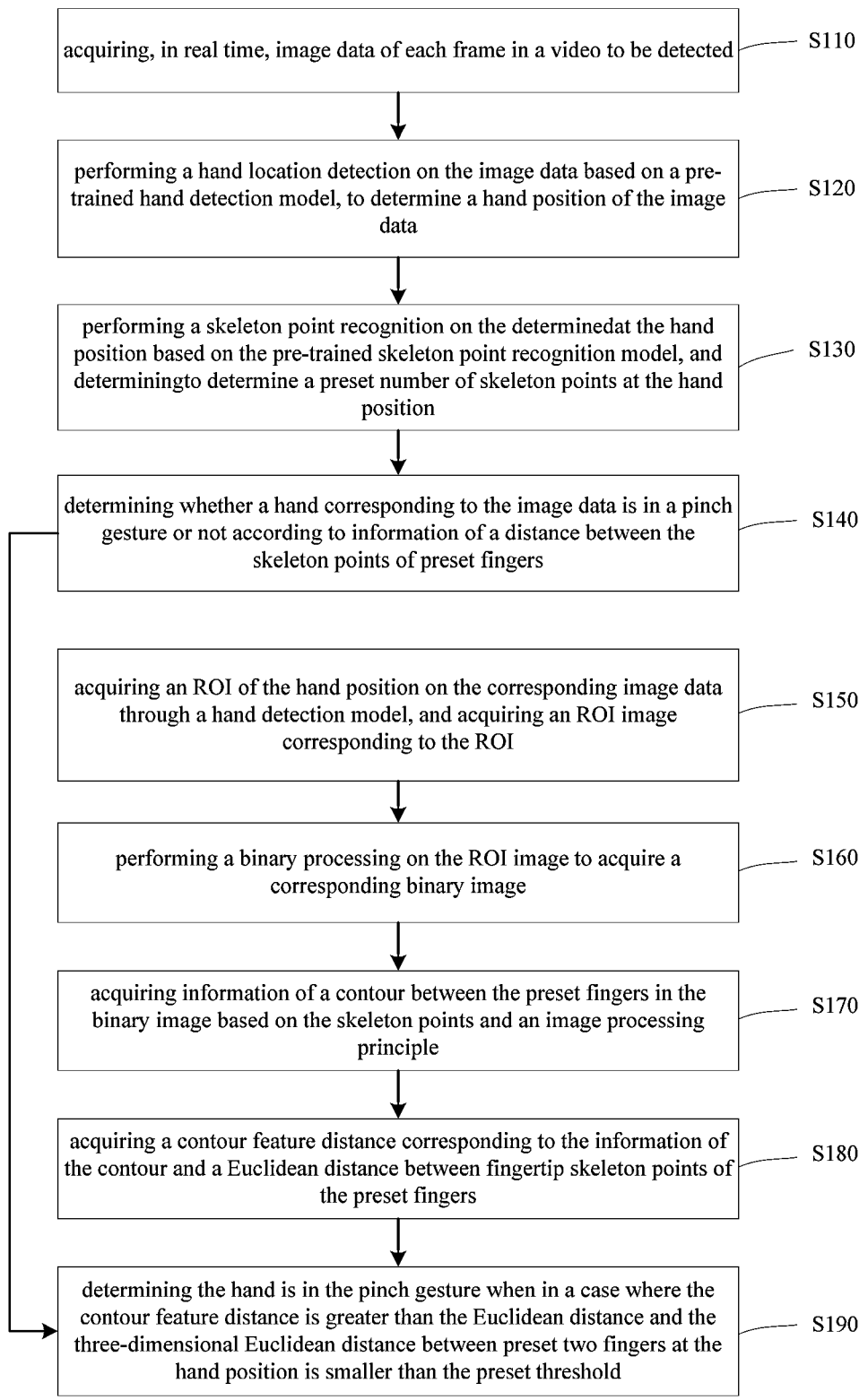
FIG. 2 is a detailed flowchart of the pinch gesture detection and recognition method according to the embodiment of the present application.
Figure 3:
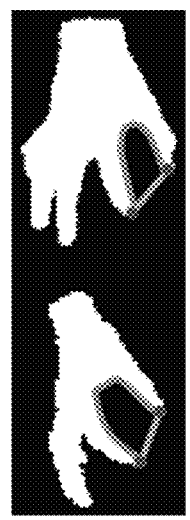
FIG. 3 is a binarized image of a hand position according to an embodiment of the present application.

Specifically, FIG. 2 shows a detailed flow of the pinch gesture detection and recognition method according to an embodiment of the present application. As shown in FIG. 2, the pinch gesture detection and recognition method provided by the present application further includes:

S150: acquiring an ROI of the hand position on the corresponding image data through a hand detection model, and acquiring an ROI image corresponding to the ROI;

S160: performing a binary processing on the ROI image to acquire a corresponding binary image, the binary image being shown in FIG. 3.

S170: acquiring information of a contour between the preset fingers in the binary image based on the skeleton points and an image processing principle;

S180: acquiring a contour feature distance corresponding to the information of the contour and a Euclidean distance between fingertip skeleton points of the preset fingers; and S190: determining the hand is in the pinch gesture in a case where the contour feature distance is greater than the Euclidean distance and the three-dimensional Euclidean distance between preset two fingers at the hand position is smaller than the preset threshold.

By defining various distance information of hands in two-dimensional and three-dimensional spaces respectively, the detection accuracy of hand posture can be improved, and further the experience of users when using VR/AR/MR head-mounted integrated equipment can be enhanced.

It should be noted that, all the operations are state detection and recognition of hand position of image data. In the video to be detected, usually a gesture lasts for a certain period of time. Therefore, the fitting state of the image data of successive N frames can be judged on the basis of the above operations. In other words, when the hands of the image data of a preset number of successive frames are all pinch gestures, the hands in the video to be detected can be determined as pinch gestures by acquiring pinch gesture information of the image data of the preset number of successive frames. N frames are empirical thresholds. In the application scenario of VR/AR/MR head-mounted integrated equipment provided by the present application, the preset threshold can be set to 5, and on the premise of stable gesture recognition, the threshold can be set to a smaller value, otherwise the user experience will be affected.

Figure 4:
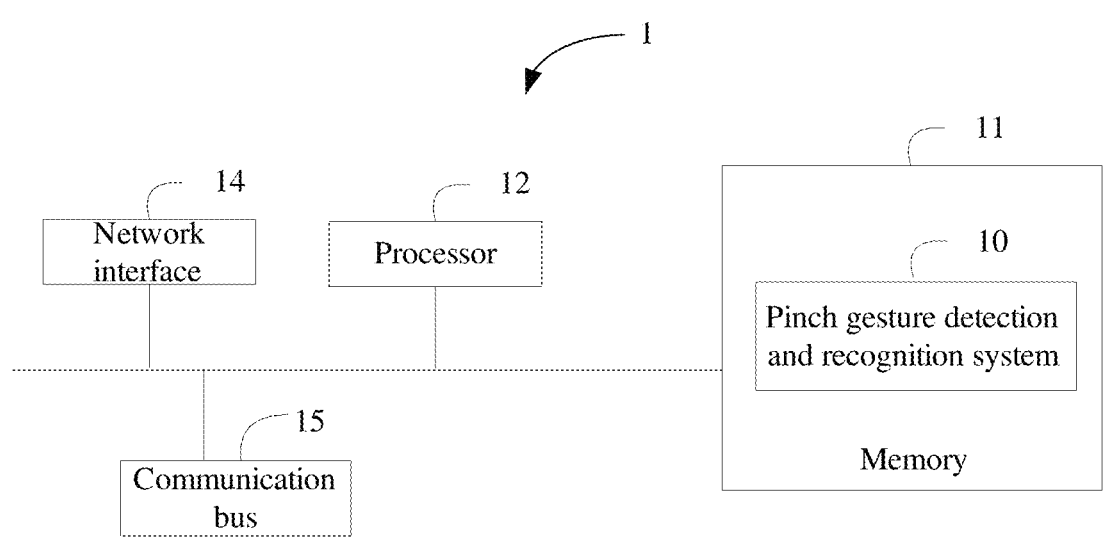
FIG. 4 is a schematic structural diagram of an electronic device according to an embodiment of the present application.

Corresponding to the pinch gesture detection and recognition method, the present application also provides an electronic device. FIG. 4 shows a schematic configuration of an electronic device according to an embodiment of the present application.

As shown in FIG. 4, an electronic device 1 of the present application may be a VR/AR/MR head-mounted integrated equipment a server, a smart phone, a tablet computer, a portable computer, a desktop computer and other terminal devices having an arithmetic function. The electronic device 1 includes a processor 12, a memory 11, a network interface 14, and a communication bus 15.

The memory 11 includes at least one type of readable storage medium. The at least one type of readable storage medium may be a non-volatile storage medium such as a flash memory, a hard disk, a multimedia card, a card-type memory 11 and the like. In some embodiments, the readable storage medium may be an internal storage unit of the electronic device 1 such as a hard disk of the electronic device 1. In other embodiments, the readable storage medium may also be an external memory 11 of the electronic device 1, such as a plug-in hard disk, a Smart Media Card (SMC), a Secure Digital (SD) card, a Flash Card, etc. provided on the electronic device 1.

In this embodiment, the readable storage medium of the memory 11 is generally disposed to store a pinch gesture detection and recognition program 10 and the like mounted on the electronic device 1. The memory 11 may also be disposed to temporarily store data that has been output or is to be output.

In some embodiments, the processor 12 may be a Central Processing Unit (CPU), a microprocessor, or other data processing chips configured to run program code or process data stored in the memory 11, such as execute the pinch gesture detection and recognition program 10 or the like.

The network interface 14 may optionally include a standard wired interface a wireless interface (e.g. a WI-FI interface) generally disposed to establish a communication connection between the electronic device 1 and other electronic devices.

The communication bus 15 is configured to achieve connection communication between these components.

FIG. 1 shows only an electronic device 1 having components 11-15, but it should be understood that not all of the shown components are required to be implemented, and more or fewer components may be implemented instead.

Alternatively, the electronic device 1 may also include a user interface, which may include an input unit such as a keyboard, a voice input device such as a microphone and other devices having a voice recognition function, a voice output device such as a sound, an earphone, etc. Alternatively, the user interface may also include a standard wired interface and a wireless interface.

Alternatively, the electronic device 1 may further include a display which may also be referred to as a display screen or a display unit. In some embodiments, it may be an LED display, a liquid crystal display, a touch-sensitive liquid crystal display, an Organic Light-Emitting Diode (OLED) touch device, and the like. The display is disposed to display information processed in the electronic device 1 and to display a visual user interface.

Alternatively, the electronic device 1 also includes a touch sensor. An area provided by the touch sensor for the user to perform touch operation is called the touch area. Further, the touch sensor described herein may be a resistive touch sensor, a capacitive touch sensor or the like. Moreover, the touch sensor includes not only a touch sensor, but also a proximity touch sensor and the like. In addition, the touch sensor may be a single sensor or may be for example a plurality of sensors arranged in an array.

In the embodiment of the device shown in FIG. 1, the memory 11, as a computer storage medium, may include an operating system and a pinch gesture detection and recognition program 10; the processor 12 executes the pinch gesture detection and recognition program 10 stored in the memory 11 to achieve the following operations:

Acquiring, in real time, image data of each frame in a video to be detected;

performing a hand location detection on the image data based on a pre-trained hand detection model, to determine a hand position of the image data;

performing a skeleton point recognition at the hand position based on the pre-trained skeleton point recognition model, to determine a preset number of skeleton points at the hand position; and determining whether the hand is in a pinch gesture or not according to information of a distance between the skeleton points of preset fingers.

In addition, the embodiment of the present application also provides a computer-readable storage medium, wherein the computer-readable storage medium includes a pinch gesture detection and recognition program, and when the pinch gesture detection and recognition program is executed by a processor, the operations of the pinch gesture detection and recognition program method as described above are realized.

On the other hand, the above pinch gesture detection and recognition program 10, that is, a pinch gesture detection and recognition system, further includes:

an image data acquisition unit configured to acquire, in real time, image data of each frame in a video to be detected;

a hand position determination unit configured to perform a hand location detection on the image data based on a pre-trained hand detection model, to determine a hand position of the image data;

a skeleton point determination unit configured to perform a skeleton point recognition at the hand position based on the pre-trained skeleton point recognition model, to determine a preset number of skeleton points at the hand position; and a gesture determination unit configured to determine whether a hand corresponding to the image data is in a pinch gesture or not according to information of a distance between the skeleton points of preset fingers.

The embodiment of the present application also provides a computer-readable storage medium having a computer program is stored thereon, which, when executed by the processor, implements any one of the above pinch gesture detection and recognition methods provided in the above method embodiments.

The detailed description of the computer-readable storage medium of the present application is roughly the same as the detailed description of the method, device and system of the above pinch gesture detection and recognition program, and will not be described herein.

It should be noted that, the terms "comprise", "include" or any other variation thereof here are intended to encompass non-exclusive inclusion, so that a process, device, article or method that includes a series of elements includes not only those elements but also other elements that are not explicitly listed, or also elements inherent to such a process, apparatus, article or method. In the absence of further limitations, an element defined by the phrase "includes a/an . . . " does not preclude the existence of another identical element in the process, device, article or method in which it is included.

The above serial numbers of the embodiments of the present application are for description only and do not represent the advantages and disadvantages of the embodiments. From the above description of the embodiments, it will be apparent to those skilled in the art that the method of the above embodiments can be implemented by means of software plus the necessary common hardware platform, and of course also by means of hardware, but in many cases the former is a preferred embodiment. Based on this understanding, the technical solution of the present application can be embodied in the form of software products in essence or the part that contributes to the prior art, the computer software product is stored in a storage medium (e.g. ROM/RAM, magnetic disk, optical disk) as described above and includes instructions for causing a terminal device (which may be a handset, computer, server, network device, etc.) to perform the methods described in various embodiments of the present application.

The pinch gesture detection and recognition method, device and system according to the present application are described above by way of example with reference to the drawings. However, it will be understood by those skilled in the art that various improvements may be made to the pinch gesture detection and recognition method, device, and system described above without departing from the content of the present application. Therefore, the scope of protection of the present application should be determined by the contents of the appended claims.

The invention claimed is:

1. A pinch gesture detection and recognition method, applied to an electronic device, comprising:
acquiring, in real time, image data of each frame in a video to be detected;
performing a hand location detection on the image data based on a pre-trained hand detection model, to determine a hand position of the image data;
performing a skeleton point recognition at the hand position based on a pre-trained skeleton point recognition model, to determine a preset number of skeleton points at the hand position; and
determining whether a hand corresponding to the image data is in a pinch gesture or not according to information of a distance between the skeleton points of preset fingers,
wherein the determining the preset number of skeleton points at the hand position comprises:
determining two-dimensional coordinate information of the preset number of skeleton points at the hand position based on the skeleton point recognition model; and
acquiring three-dimensional position coordinate information corresponding to the two-dimensional coordinate information in real time according to the two-dimensional coordinate information and a stereoscopic triangulation imaging principle; wherein the three-dimensional position coordinate information is used for determining the information of the distance between the skeleton points of the preset fingers, and/or
wherein the method further comprises:
acquiring pinch gesture information of the image data of a preset number of continuous frames; and
determining the hand in the video to be detected is in the pinch gesture in a case where the hands of the image data of the preset number of frames are all in pinch gestures.

2. The pinch gesture detection and recognition method according to claim 1, wherein the image data of each frame is acquired by at least two fisheye tracking camera.

3. The pinch gesture detection and recognition method according to claim 1, wherein determining whether the hand is in the pinch gesture or not according to information of the distance between the skeleton points of preset fingers comprises:
determining a three-dimensional Euclidean distance between the skeleton points corresponding to the preset fingers according to the three-dimensional coordinate position information; and
determining the hand is in the pinch gesture in a case where the three-dimensional Euclidean distance is smaller than a preset threshold;
determining the hand is not in the pinch gesture in a case where the three-dimensional Euclidean distance is greater than or equal to the preset threshold.

4. The pinch gesture detection and recognition method according to claim 3, wherein the method further comprises:
acquiring an Region of Interest (ROI) of the hand position on the corresponding image data through a hand detection model, and acquiring an ROI image corresponding to the ROI;
performing a binary processing on the ROI image, to acquire a corresponding binary image;
acquiring information of a contour between the preset fingers in the binary image based on the skeleton points and an image processing principle;
acquiring a contour feature distance corresponding to the information of the contour and an Euclidean distance between fingertip skeleton points of the preset fingers; and
determining the hand is in the pinch gesture in a case where the contour feature distance is greater than the Euclidean distance and the three-dimensional Euclidean distance between preset two fingers at the hand position is smaller than the preset threshold.

5. A computer-readable storage medium having a computer program stored thereon, which, when executed by a processor, implements the method of claim 4.

6. A computer-readable storage medium having a computer program stored thereon, which, when executed by a processor, implements the method of claim 3.

7. The pinch gesture detection and recognition method according to claim 1, wherein a training process of the hand detection model comprises:
  labeling a target area in an acquired training image data, and acquiring labeled position information, wherein the target area is a hand area; and
  performing, using a yolo model, a parameter training on the labeled position information until the yolo model converges within a corresponding preset range, to complete training of the hand detection model.

8. The pinch gesture detection and recognition method according to claim 7, wherein the acquired training image data is acquired by a plurality of fisheye tracking cameras on head-mounted integrated equipment.

9. A computer-readable storage medium having a computer program stored thereon, which, when executed by a processor, implements the method of claim 7.

10. The pinch gesture detection and recognition method according to claim 1, wherein a training process of the skeleton point recognition model comprises:
  training a basic neural network model based on a training image data until the basic neural network model converges within a corresponding preset range, to complete training of the skeleton point recognition model; wherein
  the basic neural network model comprises a yolo model, a Convolutional Neural Network (CNN) model, an Single Shot MultiBox Detector (SSD) model or an Feature Pyramid Network (FPN) model.

11. The pinch gesture detection and recognition method according to claim 10 wherein the training image data is acquired by a plurality of fisheye tracking cameras on a head-mounted integrated equipment.

12. The pinch gesture detection and recognition method according to claim 1, wherein
  the preset number of skeleton points comprise 21 skeleton points; and
  the 21 skeleton points comprise 3 skeleton points and 1 fingertip skeleton point for each finger, and 1 palm point of the hand.

13. A computer-readable storage medium having a computer program stored thereon, which, when executed by a processor, implements the method of claim 1.

14. An electronic device comprising: a memory, a processor and a camera device, wherein the memory includes a pinch gesture detection and recognition program, when the pinch gesture detection and recognition program is executed by the processor, the following operations are implemented:
  acquiring, in real time, image data of each frame in a video to be detected;
  performing a hand location detection on the image data based on a pre-trained hand detection model, to determine a hand position of the image data;
  performing a skeleton point recognition at the hand position based on the pre-trained skeleton point recognition model, to determine a preset number of skeleton points at the hand position; and
  determining whether the hand is in a pinch gesture or not according to information of a distance between the skeleton points of preset fingers,
  wherein the determining the preset number of skeleton points at the hand position comprises:
  determining two-dimensional coordinate information of the preset number of skeleton points at the hand position based on the skeleton point recognition model; and
  acquiring three-dimensional position coordinate information corresponding to the two-dimensional coordinate information in real time according to the two-dimensional coordinate information and a stereoscopic triangulation imaging principle; wherein the three-dimensional position coordinate information is used for determining the information of the distance between the skeleton points of the preset fingers, and/or
  wherein when the pinch gesture detection and recognition program is executed by the processor, the following further operations are implemented;
  acquiring pinch gesture information of the image data of a preset number of continuous frames; and
  determining the hand in the video to be detected is in the pinch gesture in a case where the hands of the image data of the preset number of frames are all in pinch gestures.

15. The electronic device according to claim 14, wherein when determining whether the hand is in the pinch gesture or not according to information of the distance between the skeleton points of preset fingers, when the pinch gesture detection and recognition program is executed by the processor, the following operations are implemented:
  determine a three-dimensional Euclidean distance between the skeleton points corresponding to the preset fingers according to the three-dimensional coordinate position information; and
  determine the hand is in the pinch gesture in a case where the three-dimensional Euclidean distance is smaller than a preset threshold;
  determine the hand is not in the pinch gesture in a case where the three-dimensional Euclidean distance is greater than or equal to the preset threshold.

16. The electronic device according to claim 15, wherein when the pinch gesture detection and recognition program is executed by the processor, the following further operations are implemented:
  acquire an Region of Interest (ROI) of the hand position on the corresponding image data through a hand detection model, and acquire an ROI image corresponding to the ROI;
  perform a binary processing on the ROI image, to acquire a corresponding binary image;
  acquire information of a contour between the preset fingers in the binary image based on the skeleton points and an image processing principle;
  acquire a contour feature distance corresponding to the information of the contour and an Euclidean distance between fingertip skeleton points of the preset fingers; and
  determine the hand is in the pinch gesture in a case where the contour feature distance is greater than the Euclidean distance and the three-dimensional Euclidean distance between preset two fingers at the hand position is smaller than the preset threshold.

17. A pinch gesture detection and recognition system, comprises a memory storing instructions and a processor in communication with the memory, wherein the processor is configured to execute the instructions to:

acquire, in real time, image data of each frame in a video to be detected;
perform a hand location detection on the image data based on a pre-trained hand detection model, to determine a hand position of the image data;
perform a skeleton point recognition at the hand position based on the pre-trained skeleton point recognition model, to determine a preset number of skeleton points at the hand position; and
determine whether a hand corresponding to the image data is in a pinch gesture or not according to information of a distance between the skeleton points of preset fingers,
wherein the processor, when determine the preset number of skeleton points at the hand position, is further configured to:
determine two-dimensional coordinate information of the preset number of skeleton points at the hand position based on the skeleton point recognition model; and
acquire three-dimensional position coordinate information corresponding to the two-dimensional coordinate information in real time according to the two-dimensional coordinate information and a stereoscopic triangulation imaging principle; wherein the three-dimensional position coordinate information is used for determining the information of the distance between the skeleton points of the preset fingers, and/or
wherein the processor is further configured to:
acquire pinch gesture information of the image data of a preset number of continuous frames; and
determine the hand in the video to be detected is in the pinch gesture in a case where the hands of the image data of the preset number of frames are all in pinch gestures.

18. The pinch gesture detection and recognition system according to claim 17, wherein the image data of each frame is acquired by at least two fisheye tracking camera.

19. The pinch gesture detection and recognition system according to claim 17, wherein the processor, when determining whether the hand is in the pinch gesture or not according to information of the distance between the skeleton points of preset fingers, is further configured to:
determine a three-dimensional Euclidean distance between the skeleton points corresponding to the preset fingers according to the three-dimensional coordinate position information; and
determine the hand is in the pinch gesture in a case where the three-dimensional Euclidean distance is smaller than a preset threshold;
determine the hand is not in the pinch gesture in a case where the three-dimensional Euclidean distance is greater than or equal to the preset threshold.

20. The pinch gesture detection and recognition system according to claim 19, wherein the processor is further configured to:
acquire an Region of Interest (ROI) of the hand position on the corresponding image data through a hand detection model, and acquire an ROI image corresponding to the ROI;
perform a binary processing on the ROI image, to acquire a corresponding binary image;
acquire information of a contour between the preset fingers in the binary image based on the skeleton points and an image processing principle;
acquire a contour feature distance corresponding to the information of the contour and an Euclidean distance between fingertip skeleton points of the preset fingers; and
determine the hand is in the pinch gesture in a case where the contour feature distance is greater than the Euclidean distance and the three-dimensional Euclidean distance between preset two fingers at the hand position is smaller than the preset threshold.

* * * * *